Jan. 22, 1963 W. C. BUTTNER, SR., ETAL 3,074,700

CARBONATING APPARATUS

Filed Dec. 7, 1959 9 Sheets-Sheet 1

WILLIAM C. BUTTNER, SR.
WILLIAM C. BUTTNER, JR.
INVENTORS

BY Francis D. Amman
ATTORNEY

CARBONATING APPARATUS

Filed Dec. 7, 1959 9 Sheets-Sheet 2

WILLIAM C. BUTTNER, SR.
WILLIAM C. BUTTNER, JR.
INVENTORS

BY Francis D. Amman
ATTORNEY

WILLIAM C. BUTTNER, SR.
WILLIAM C. BUTTNER, JR.
INVENTORS

BY Francis D. Amman

ATTORNEY

WILLIAM C. BUTTNER, SR.
WILLIAM C. BUTTNER, JR.
INVENTORS

BY Francis D. Ammen
ATTORNEY

WILLIAM C. BUTTNER, SR.
WILLIAM C. BUTTNER, JR.
INVENTORS

BY Francis D. Ammen
ATTORNEY

INVENTOR.
WILLIAM C. BUTTNER, SR.
WILLIAM C. BUTTNER, JR.
BY
ATTORNEY

INVENTORS
WILLIAM C. BUTTNER, SR.
WILLIAM C. BUTTNER, JR.
BY
A. Dnehan Oliver
ATTORNEY.

INVENTORS
WILLIAM C. BUTTNER, SR.
WILLIAM C. BUTTNER, JR.
BY
ATTORNEY

INVENTORS
WILLIAM C. BUTTNER, SR.
WILLIAM C. BUTTNER, JR.
BY [signature]
ATTORNEY.

3,074,700
CARBONATING APPARATUS

William C. Buttner, Sr., Arcadia, and William C. Buttner, Jr., Saratoga, Calif.; Emily B. Buttner, executrix of said William C. Buttner, Sr., deceased, assignor to said William C. Buttner, Jr., Saratoga, Calif.

Filed Dec. 7, 1959, Ser. No. 857,992
15 Claims. (Cl. 261—135)

This invention relates to apparatus for charging a liquid with a gas under pressure, and while the invention can readily be incorporated in any type of such apparatus, it is particularly applicable to carbonating apparatus. It is especially useful with household and restaurant carbonators for preparing carbonated beverages. This application is a continuation-in-part of application Serial No. 716,819, filed February 21, 1958, now abandoned, which, in turn, was a continuation-in-part of application Serial No. 502,066, filed April 18, 1955, now abandoned.

One problem which this invention solves is that of obtaining adequate absorption of carbon dioxide by water. The degree of saturation is usually spoken of in terms of the "volumes" absorbed. "One volume" of absorption of $CO_2$ gas in water is obtained when one cubic unit of gaseous $CO_2$ is dissolved in one cubic unit of water at a given temperature and pressure. For example, when two cubic feet of $CO_2$ gas are dissolved in one cubic foot of water, the degree of saturation is spoken of as "two volumes." Beverage satisfaction is not obtained unless the carbonation saturation is at least between 3 and 4 volumes, and most commercially bottled beverages maintain this degree of saturation.

Heretofore, most carbonators relied on agitation to achieve sufficient absorption of carbon dioxide by water. In commercial carbonators, paddle wheels were often used to mix the liquid with a volume of carbon dioxide under pressure. Always, there had to be a capacious cushion of the gas under pressure. In some commercial carbonators, water was sprayed into this gas cushion, as a form of mixing and agitation; in others a pump was used to send alternate charges of liquid and carbon dioxide under pressure into a line. In any event, agitation achieved the mixing.

In home carbonators, agitation was usually sought by shaking the container. The gas was introduced into the liquid in a closed vessel under sufficient pressure to effect some absorption of the gas by the liquid; the liquid took up about half to three-fifths of the volume of the vessel, while the gas under pressure took up the remainder; then the vessel was rolled or shaken to increase the absorption. But such agitation is a nuisance, is often impractical in home equipment, and consumes too much time.

Moreover, in home equipment the provision of the large cushion of carbon dioxide in the vessel meant that a large amount of gas had to be wasted on each batch of carbonated water. In other words, all the unabsorbed gas, occupying 40% to 50% of the vessel's volume and under considerable pressure, had to be released to the atmosphere each time a batch of water was carbonated, for there is no way to put the carbon dioxide back into a cylinder of the compressed gas. So home methods were quite impractical and never became commercial successes.

$CO_2$ equipment has also been used with siphon bottles and cartridges. Attempts were made to obtain carbonation by filling a high pressure cylinder with water, leaving little or no gas space above the water, and then injecting $CO_2$ gas at full pressure direct from a cylinder under a pressure of 800 to 900 p.s.i., but this approach was a failure. Under these conditions the gas was not properly absorbed. Pressure alone does not guarantee carbon dioxide absorption under water without agitation and the passage of time.

One object of this invention is to provide a home carbonator that obtains excellent carbonation without agitation. This invention makes it possible to effect absorption of gas to the desired amount, for example, 3 to 4 volumes of $CO_2$ gas per volume of water, and to do so quickly. The charged liquid can then readily be transferred from the charging chamber to small containers, such as bottles or the like, without losing any substantial amount of the gas content and without signficant ebullition or eruption during the transfer.

The problem was solved by a novel combination of pressure and orifice conditions. A very small orifice is used as the nozzle where the gas met the water. This orifice may be a pinched-off tube or one or several very small round holes.

When using a small diameter nozzle of either type and when the tube to the nozzle passes through cold water on the way to the nozzle, it becomes difficult to prevent liquefaction of the carbon dioxide. This is less of a problem when the the carbon dioxide is 100% dry, but commercial carbon dioxide tanks are not dry, especially after they have been allowed to stand empty with open valves. The empty tank breathes air, and, with temperature changes, moisture from the air can condense, leaving a deposit of water in the tank. As a result of its water content, the cooling of the gas causes liquefaction of high-pressure gas flowing directly from the tank, and the contained water freezes and plugs the nozzle—a very serious problem in home carbonation, where the persons using the equipment cannot be expected to be highly skilled in this field. The present invention has solved this problem by providing an orifice spaced from the nozzle in the tube between the nozzle and the gas cylinder and by relating the size of the nozzle to the size of the orifice. Thereby, under flow conditions the building up of pressure in the cold zone just back of the nozzle is prevented, and this, in turn, prevents liquefaction, which on revaporization causes Dry Ice and freezes the water.

Carbon dioxide is usually sold in liquid form in cylinders under very high pressure, which necessarily must be reduced before it can be used in a home carbonator. Heretofore this considerable reduction in pressure was accomplished by a pressure-reduction valve or regulator. However, satisfactory valves and regulators are much too expensive to be practical for home use.

Another object of this invention is to provide simple and inexpensive means for effecting substantial pressure reduction in high-pressure cylinder gas delivered to a carbonator or like device. This invention incorporates a novel pressure reducer that avoids the necessity for any pressure-controlled or pressure-sensitive movable part such as the diaphragms usually employed in regulator valves. The invention therefore greatly reduces both the cost and the complexity of carbonation equipment.

Another object of this invention is to provide a charging chamber with simple control means for filling the chamber with the liquid to be charged with gas. Another object is to provide this charging chamber with valves for (*a*) filling the chamber, (*b*) indicating when the chamber has become filled with liquid, and is ready to be charged with gas, and (*c*) discharging the charged liquid from the chamber.

Another object of the invention is to provide a single control element that can be manipulated to effect the complete cycle of operation outlined in the preceding paragraph.

Another object of the invention is to provide a very simple and inexpensive carbonator unit using several simple valves to accomplish the same cycle.

Another object of our invention is to provide means for minimizing a tendency of the gas-charged liquid toward ebullition or eruption apparently caused by catalytic action when the gas-charged liquid flows through basic metal ducts.

Another object of the invention is to provide an improved delivery system for gas into liquid being charged. Our improved system insures that the gas will maintain its gaseous form in the delivery system and enables the admitted gas to develop a considerable degree of internal agitation that favors its rapid absorption by the liquid.

Another object of the invention is to provide a nozzle that delivers the gas into the liquid in a manner favoring the formation of a multiplicity of bubbles. Achievement of this object increases the efficiency of the nozzle in effecting absorption of the gas by the liquid. The nozzle also co-acts with an inlet tube to help prevent liquefaction of the gas while it passes to the nozzle.

Further objects of the invention will appear from the following specification and the accompanying drawing, where some preferred embodiments thereof are shown and described in detail.

Figures 2, 3, 4:
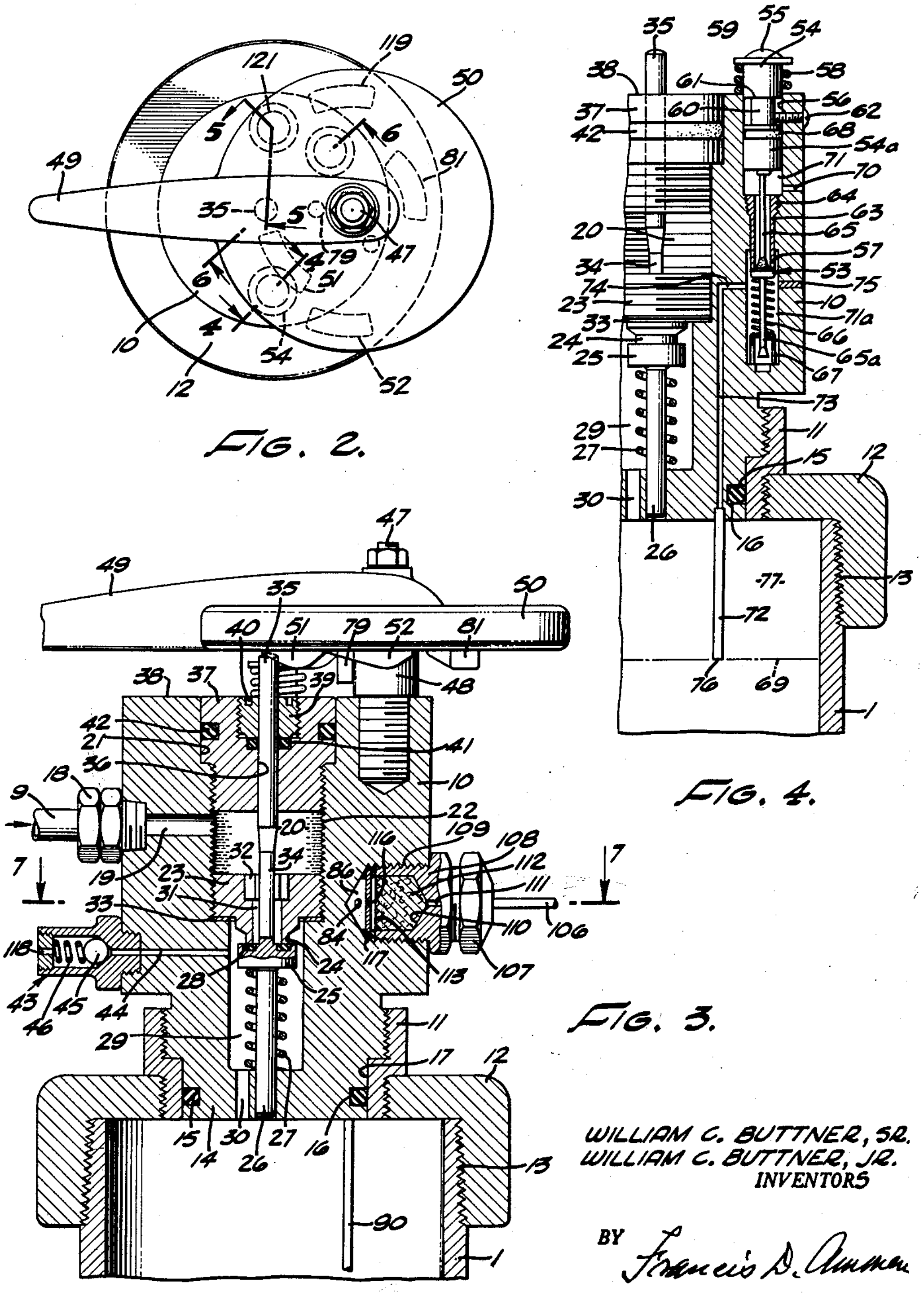
FIG. 2 is a top plan view on an enlarged scale of the control head of FIG. 1, with the control valves in neutral position. It also illustrates a single control element capable of controlling all of the valves except the valve for relieving the pressure in the charging chamber.
FIG. 3 is a further enlarged fragmentary view in elevation and in vertical section through the control head, particularly illustrating the inlet connection and the inlet valve for supplying liquid to the charging chamber. It also illustrates the inlet connection for admitting gas under pressure to the control head.

FIG. 4 is a further enlarged, fragmentary view in elevation and in vertical section taken about in the plane of the line 4—4 of FIG. 2, and particularly illustrating a vent valve. This vent valve functions as a tell-tale for indicating when the liquid charge in the charging chamber is filled to a desired level, while leaving an air cushion into which gas such as $CO_2$ can be compressed to effect desired carbonation; it can also function as a control vent for permitting charging gas to escape from the chamber when desired.

Figure 5:
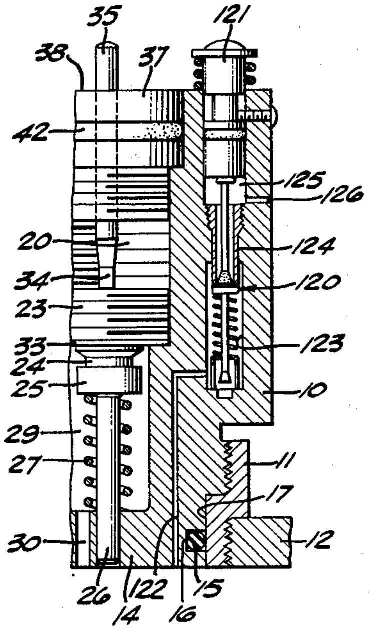

FIG. 5 is a fragmentary view in elevation and in vertical section, taken along the plane of the line 5—5 in FIG. 2 but on an enlarged scale, and particularly illustrates another vent valve which relieves pressure in the charging chamber when it is drained by gravity flow, as when the charged liquid is being run into a container.

Figure 6:
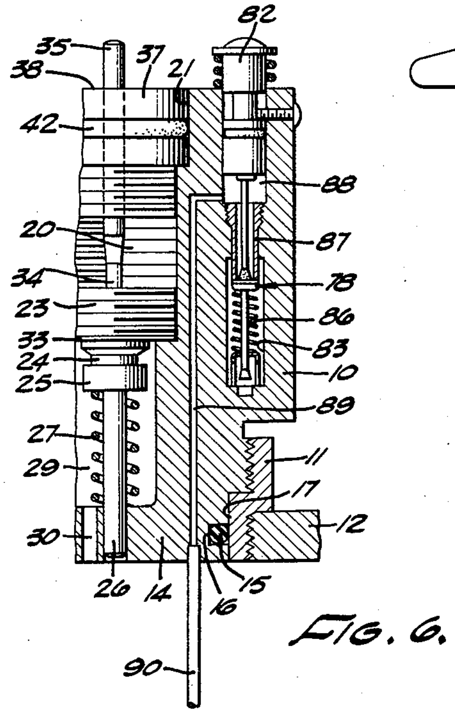

FIG. 6 is a fragmentary view in elevation and in vertical section taken in the plane of the line 6—6 in FIG. 2, but on an enlarged scale, and illustrates an inlet valve for admitting gas to the charging chamber.

Figure 7:
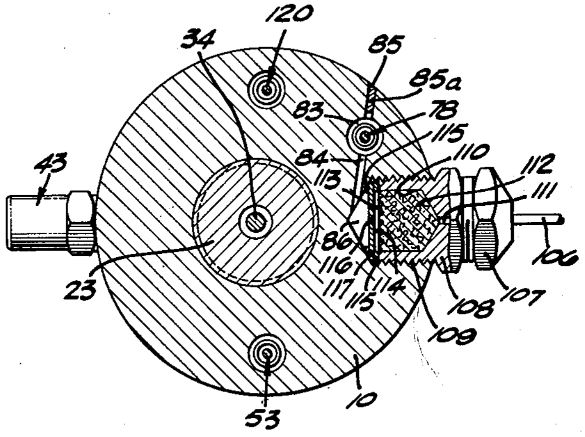

FIG. 7 is a view in horizontal section taken along the plane of the line 7—7 in FIG. 3, through the control head on the axis of the high pressure gas inlet.

Figure 8:
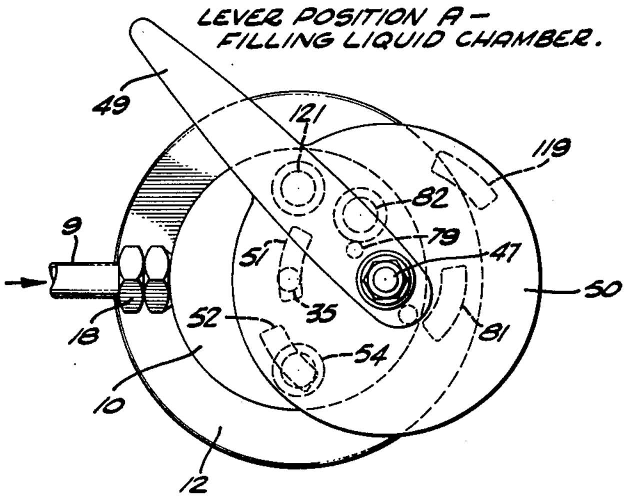

FIG. 8 is a top plan view similar to FIG. 2, showing the handle of the control element in the position which opens the liquid-valve, for supplying liquid to the interior of the charging chamber, and simultaneously opens the tell-tale vent that will indicate when the charging chamber is filled.

Figures 9, 10:
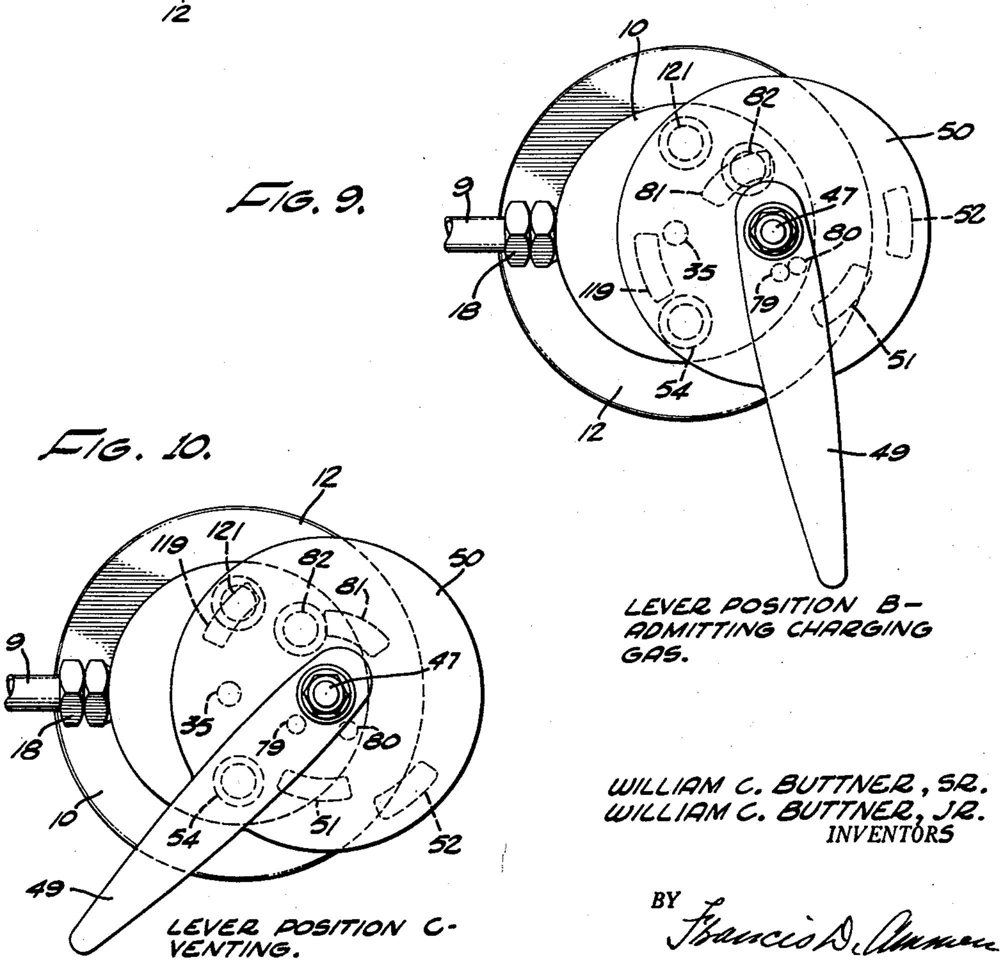

FIG. 9 is a view similar to FIG. 8, showing the control element in the position that opens the gas-charging valve to permit flow of gas into the charging chamber.

Figure 1:
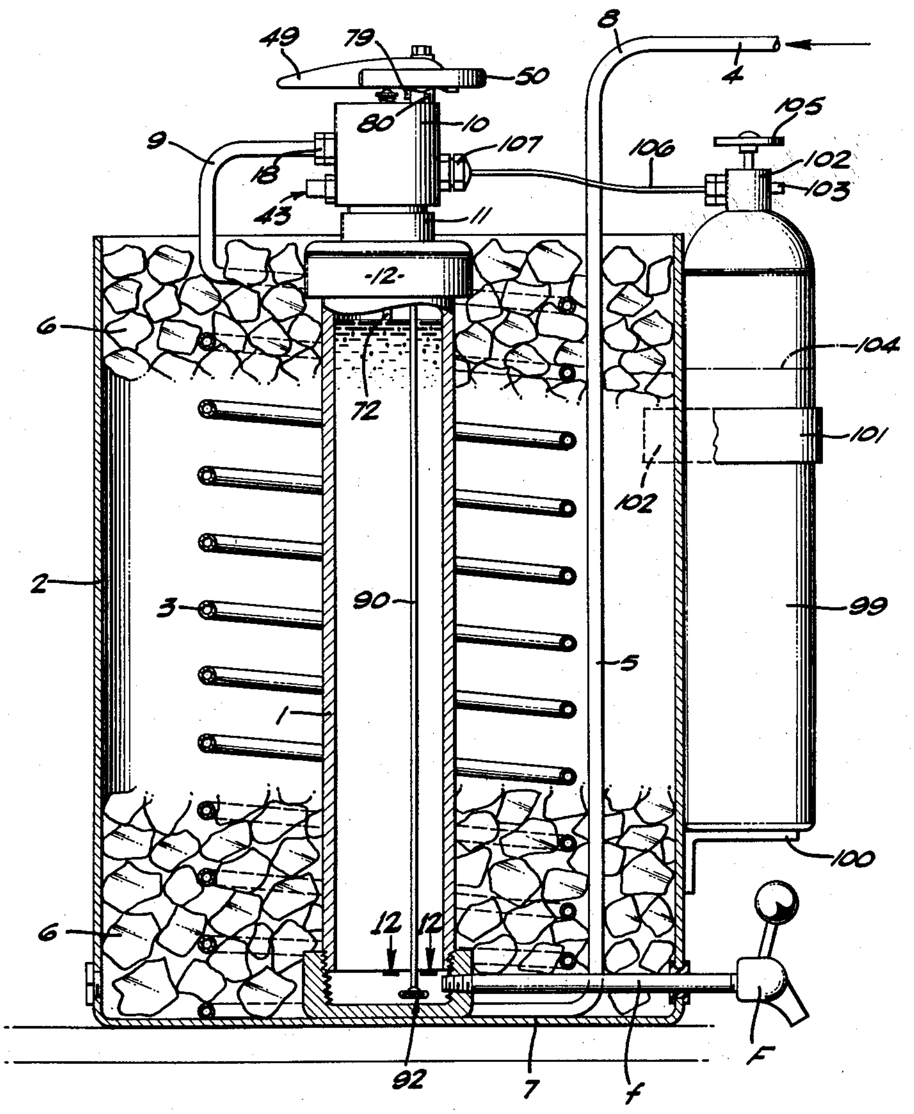
FIG. 1 is a view in elevation and partly in vertical section of an apparatus embodying the principles of our invention, and showing a refrigerated charging chamber, in section, a control head, in elevation, and a supply cylinder for delivery of gas under pressure to the control head.

FIG. 10 is a view similar to FIGS. 8 and 9, showing the control element in a position to open the vent which discharges gas to the atmosphere and admits air into the charging chamber when the charged liquid is being drawn off through a faucet, such as shown in FIG. 1.

Figure 11:
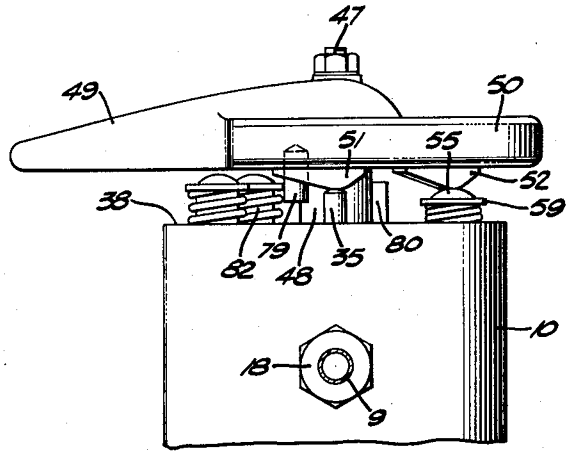

FIG. 11 is a fragmentary view in side elevation of the upper end of the control head.

Figure 12:
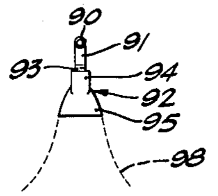

FIG. 12 is a view in section taken along the line 12—12 in FIG. 1 and showing a nozzle that may be employed and the outlet connection through which the charged gas is delivered into the liquid in the charging chamber at a low level.

Figure 13:
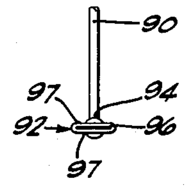

FIG. 13 is a view in front elevation of the nozzle and its supporting pipe connection, shown in FIG. 12.

Figure 14:
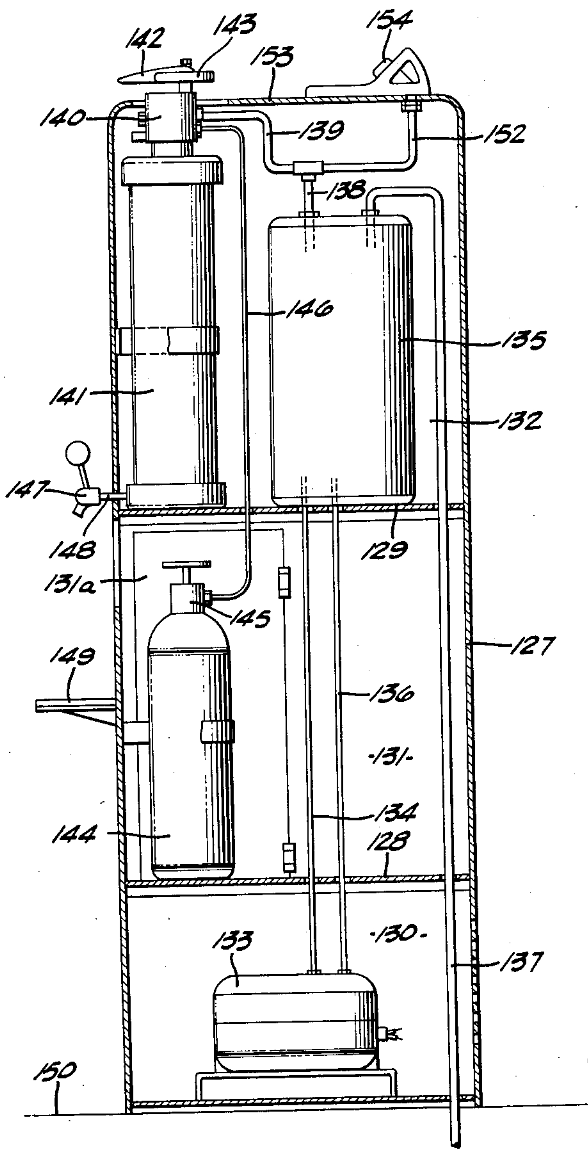

FIG. 14 is a view in elevation and vertical section through an upright housing for apparatus such as illustrated in FIGS. 1 to 13. This view shows a general arrangement for a charging unit having its own power-driven refrigerating plant for supplying water at a low temperature for the successive charging of the charging chamber.

Figures 15, 16, 17:
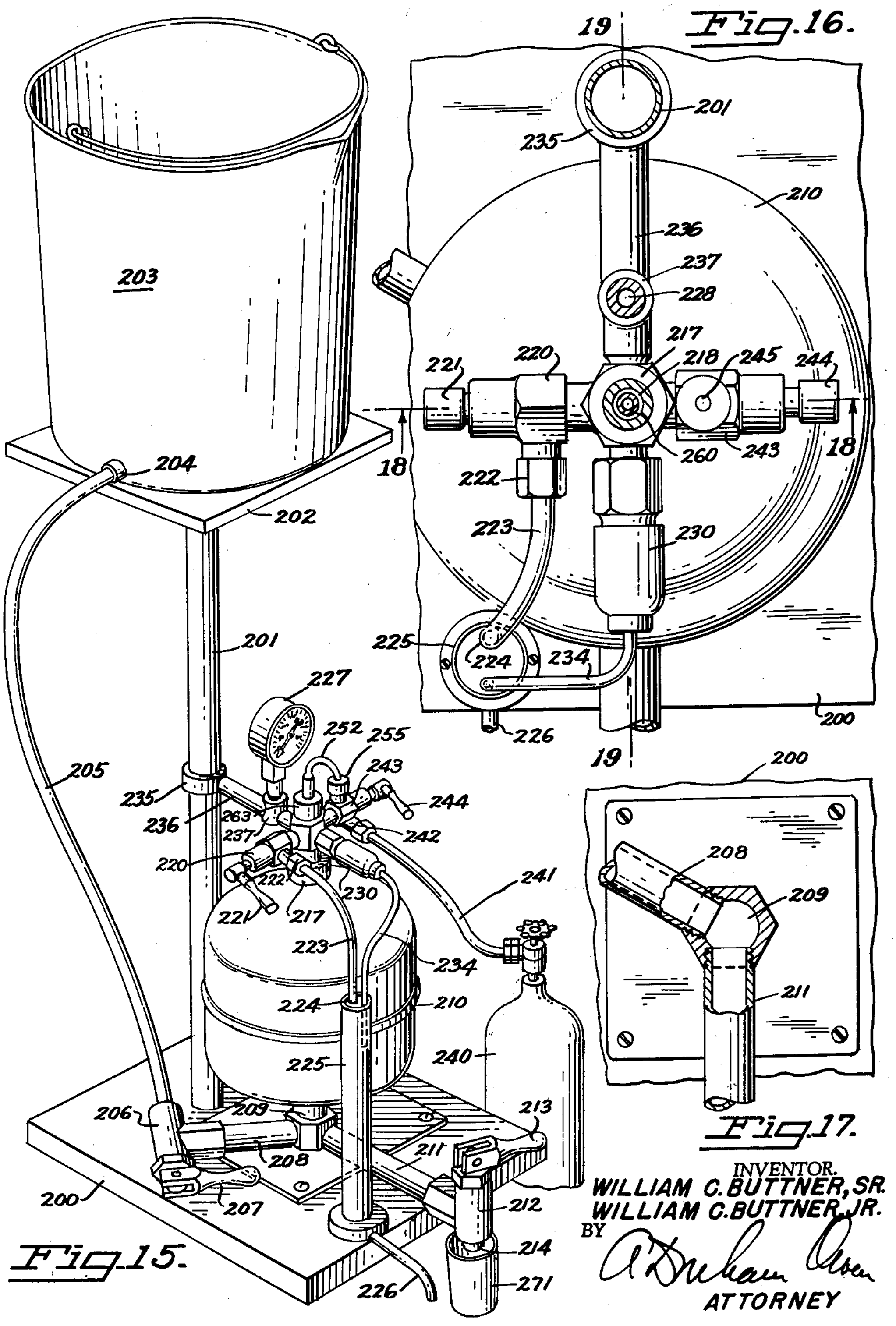

FIG. 15 is a view in perspective of a modified form of carbonating unit embodying a simplified form of the invention.

Figure 18:
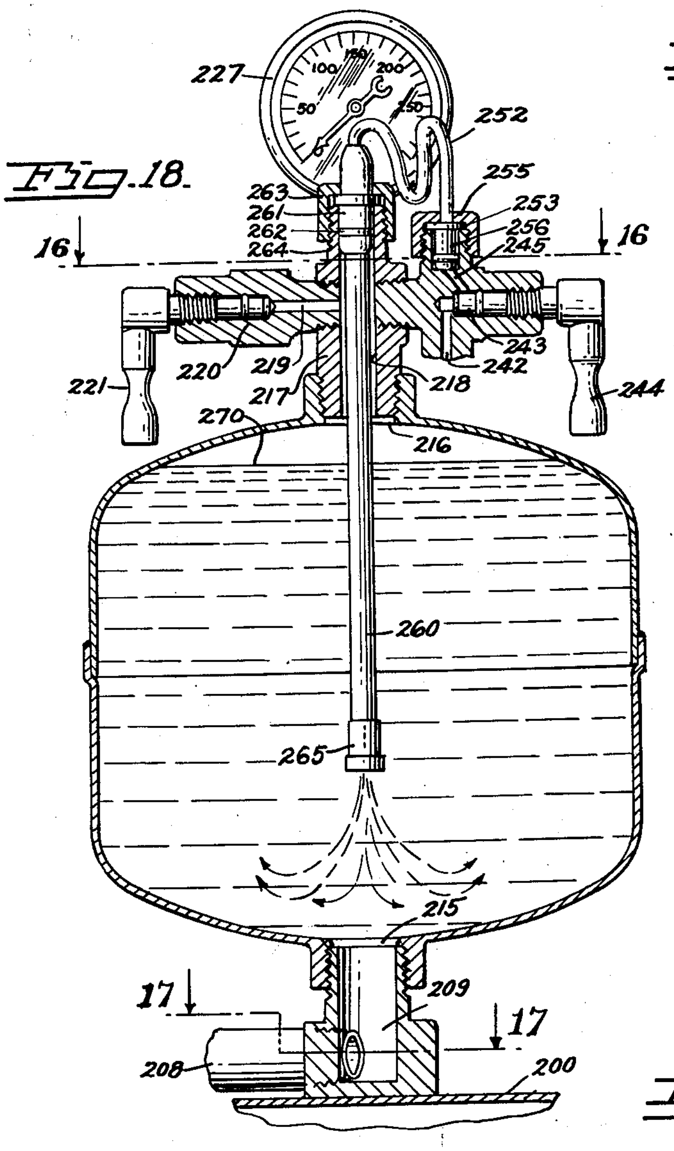

FIG. 16 is an enlarged top plan view partly in section of a portion of the unit of FIG. 15, taken along the line 16—16 in FIG. 18.

FIG. 17 is an enlarged plan view partly in horizontal section, of the bottom fitting for the charging tank of FIG. 15, taken along the line 17—17 in FIG. 18.

FIG. 18 is a view in elevation and in vertical section taken along the line 18—18 in FIG. 16.

Figure 19:
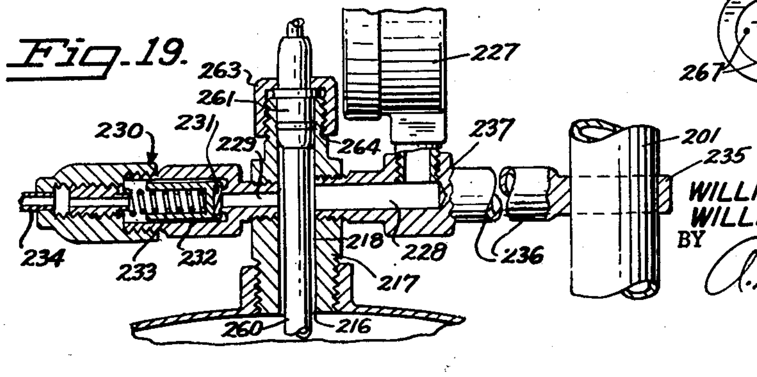

FIG. 19 is a fragmentary view in elevation and in vertical section taken along the line 19—19 in FIG. 16, with a portion broken in the middle, to conserve space.

Figure 20:
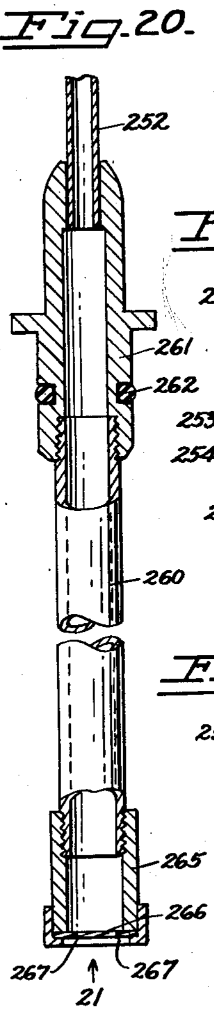

FIG. 20 is a further enlarged view in elevation and partly in section of the vertical gas inlet tube shown in FIG. 18.

Figure 21:
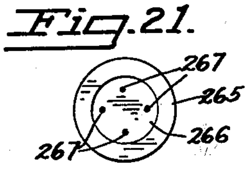

FIG. 21 is a bottom plan view of the outlet end of the gas inlet tube looking in the direction of the arrow 21 in FIG. 20.

Figure 22:
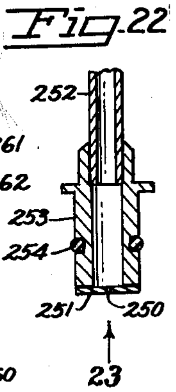

FIG. 22 is an enlarged view in elevation and in vertical section of the inlet end of the gas inlet tube.

Figure 23:
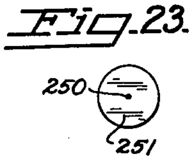

FIG. 23 is a bottom plan view looking in the direction of the arrow 23 in FIG. 22.

Figure 24:
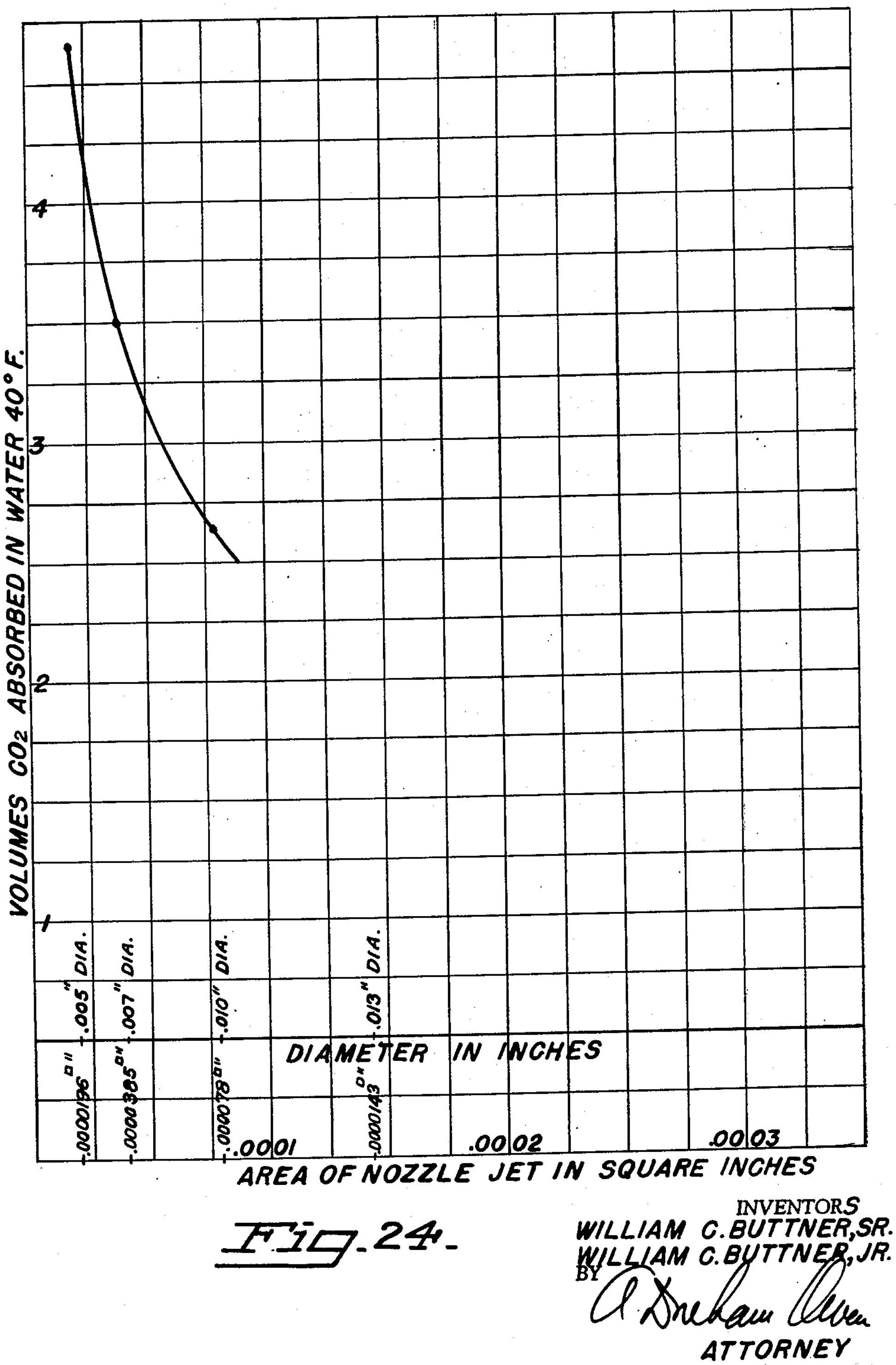

FIG. 24 is a graph showing the effect of orifice size upon $CO_2$ gas absorption by water.

Figure 25:
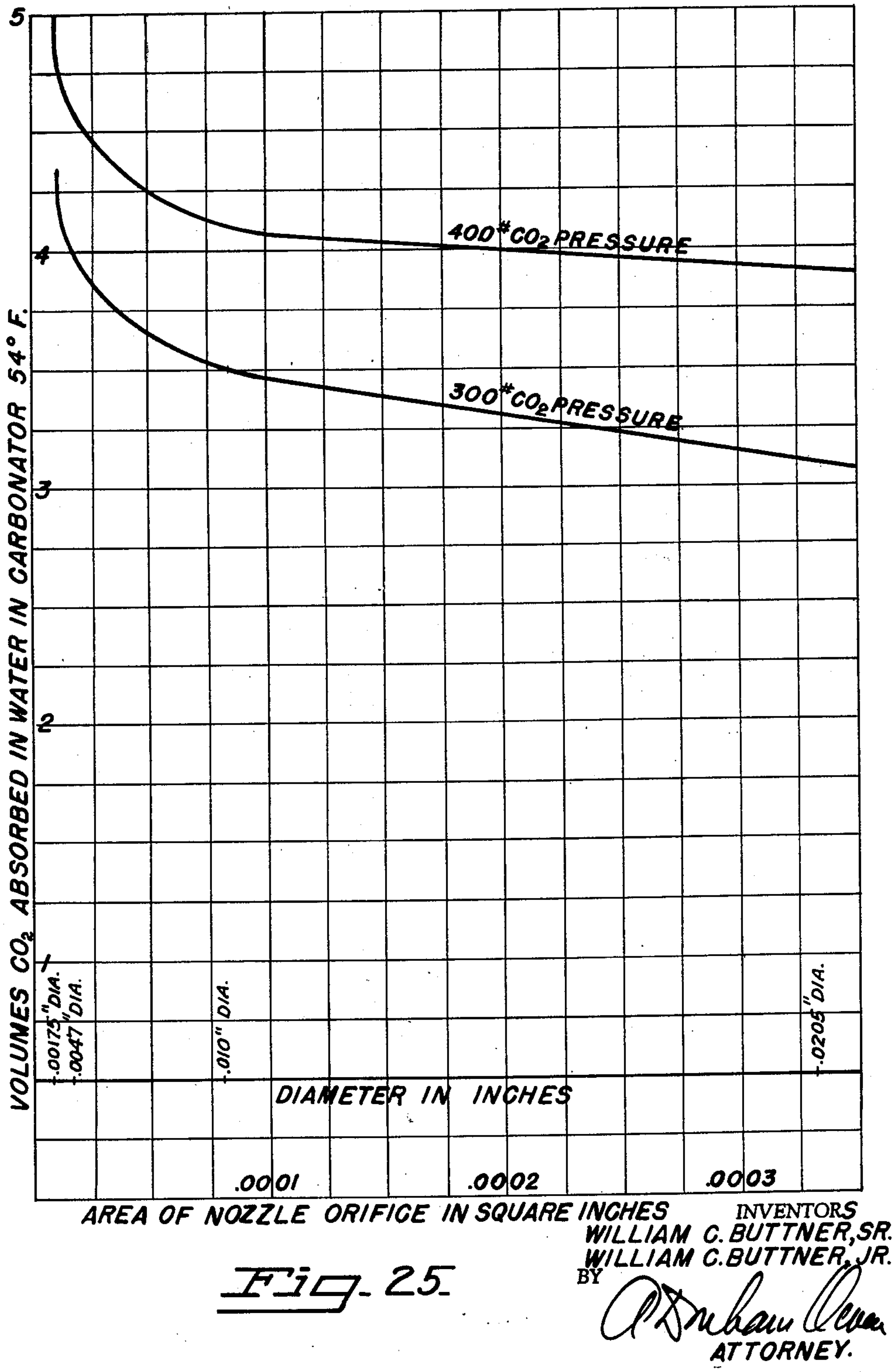

FIG. 25 is another graph showing the effects of both nozzle orifice size and back pressure on $CO_2$ gas absorption by water.

*The Carbonator of FIGS. 1–13*

The apparatus of our invention shown in FIGS. 1–13 includes a charging chamber 1, which holds the liquid that is to be charged with a gas under pressure. As illustrated in FIG. 1, the charging chamber 1 may be located substantially centrally in an outer container 2.

The container 2 may provide part of the means for refrigerating the liquid as it flows to the chamber 1, for a refrigerating coil 3 may be supplied with the liquid from an inlet pipe 4 and a lead-in pipe 5 that passes down through an ice pack 6 to the bottom 7 of the outer container or casing 2, where the pipe 5 leads into the lower end of the coil 3, with which it may be integral as shown. Any refrigerating means can be provided, but broken ice 6 is satisfactory in small installations. A valve (not illustrated) for controlling the flow of liquid to the coil 3 may be placed at any convenient point, preferably in the vicinity of the lead-in tubing 5.

The upper end of the coil 3 may be integral with a gooseneck 9 that leads into a control head 10, which is shown in vertical section in FIG. 3. The lower end of the control head 10 may be mounted by means of a threaded bushing 11, in a cap 12 which is secured to the upper end of the charging chamber by a pipe thread connection 13. In order to effect a gas-tight sealing connection, the lower end of the control head 10 may be provided with a reduced neck 14 carrying sealing means such as an O-ring 15 in an annular groove 16 that seats against a plain bore 17 of the bushing 13. Any other desired means may be employed at this point for preventing escape of gas under pressure from the upper end of the charging chamber 1.

Through a suitable connection 18 the liquid from the gooseneck 9 is admitted through a passage 19 into a receiving chamber 20 (see FIG. 3). The receiving chamber 20 is located in the upper part of a well extending down from a counterbore 21 at the upper end of the head 10. Below the counterbore 21 the well wall preferably has a thread 22 to receive a bottom head 23, the lower end of which has an annular downwardly projecting valve core terminating in a valve seat 24, to cooperate with a valve closure 25. This valve closure 25 may be a disc or collar integral with a guide stem 26 guided in a bore of suitable diameter drilled in the lower portion of the neck 14. A coil spring 27 normally holds this valve 25 to its seat 24, and the upper face of the valve closure 25 is provided with a sutiable gasket 28 to insure effective sealing when closed.

The valve closure 25 is preferably located in a valve chamber 29 of larger diameter than the closure 25 and the lower end of this chamber 29 has a passage 30 through which liquid is admitted when the valve is open, passing through a passage 31 that extends down from the receiving chamber 20. The upper end of the passage 31 may be milled out to form an angular socket 32, which may be of hexagonal form so that the bottom head 23 can be screwed down onto its annular sealing gasket 33.

The valve closure 25 has an upper stem 34 on its axis, and on it rests the lower end of an actuator stem 35. The stem 35 is mounted to slide in a guide opening 36 in a follower plug 37 the lower end of which is threadedly engaged with the thread 22 of the receiving chamber 20. The upper end of the actuator stem 35 projects above the upper face 38 of the control head 10, being slidable through a threaded plug 39. The plug 39 has sockets 40 so that a spanner wrench can be used to screw it down against a sealing O-ring 41 and prevent escape of gas through the guide opening in the plug 39. The upper portion of the plug 37 is of enlarged diameter and carries a sealing O-ring 42 in an annular groove in its side face. All the sealing rings employed are preferably of Neoprene.

In order to limit the pressure of the gas in the upper end of the charging chamber, a relief valve 43 is attached on the side of the control head 10; its interior communicates with a radial passage 44 that leads from the valve chamber 29. The relief valve 43 is illustrated, by way of example, as a ball valve 45 normally held on its seat by a coil spring 46.

Pivotally mounted on a pintle 47, which is integral with a post 48 whose base is threaded onto the upper face 38 of the control head 10, is a control lever or handle 49. The handle 49 is preferably made integral with a cam disc 50 having a plurality of cams on its inner side for controlling all the valves in the control head 10. Normally the handle 49 is in its neutral position, illustrated in FIG. 2, but it is moved to several different positions during the cycle of operations.

The first position to which the lever 49 is moved in the charging cycle is its position A, shown in FIG. 8. One cam 51 is located at the same radius from the axis of the pintle 47 as the actuator stem 35 for the liquid valve 25; so when the cam 51 moves over the upper end of the actuator 35 to the position A, the valve stem 34 is thrust downward to open the valve. Liquid from the pipe connection 9 then flows in through the passage 19, receiving chamber 20, and the duct 31, past the valve seat 24, and then through the valve chamber 29 and the passage 30 into the charging chamber 1.

The underside of the body or disc 50 also carries a cam 52 (see FIG. 8), and in the position A this cam 52 holds open a vent valve 53 (see FIG. 4), by pushing down an actuator head 54 for the valve 53. The actuator head 54 has a rounded terminal tip 55 to facilitate its cooperation with the cam 52, and its body is guided to slide up and down in a bore 56. Normally it is biased by a coil spring 58 to an elevated position to hold the valve 53 on its seat 57, the spring 58 thrusting against the under side of the collar 59. The head 54 also has a waist 60 of reduced diameter, above which is a shoulder 61. The shoulder 61 cooperates with a screw 62 projecting into the bore 56 to act as a stop limiting the downward and upward movement of the vent valve 53; however, it always permits the valve to seat firmly.

The seat 57 for the valve 53 is the end face of a tubular valve core 63, the upper end of which is formed into a tapered neck 64 that is threaded into the lower end of the bore 71. The lower portion 54*a* of the actuating head 54 carries a stem 65 for the valve 53 and a sealing ring 68, preferably of Neoprene. Centered about the stem 65 is a local return coil spring 66 that thrusts up against the underside of the valve. A lower stem 65*a* slides through a skeleton type guide 67, against which the lower end of the spring 66 is seated.

The vent valve 53 operates as a tell-tale to indicate when the charging chamber is substantially filled or filled to a desired level 69. For this purpose a vent port 70 leads to the atmosphere from the upper valve chamber or bore 71. A dip tube 72 extends down from a drilled outlet passage 73. A lateral duct 74 leads escaping liquid from the passage 73 into the lower valve chamber 71*a*, and thence up past the open valve 53, through the tubular core 63 and the upper chamber 71, to the tell-tale outlet 70. The lateral duct 74 may be formed by drilling in from the outer face of the control head 10, the outer portions being subsequently closed by a tight plug 75.

When the liquid level in the chamber 1 rises slightly above the mouth 76 of the dip tube, the air in the space 77 above the level 69 will become slightly compressed, and this causes a small quantity of the liquid to spurt up the passage 73, and out of the vent 70. This ejection of liquid at the outlet port 70 is a tell-tale, indicating that the chamber 1 is full of liquid and is ready to be charged.

The control lever 49 is then swung in an anti-clockwise direction to the lever position B shown in FIG. 9. This lever position opens the gas charging valve 78 (see FIGS. 6, 7, and 9). The lever 49 is stopped from further rotation by a stop pin 79 on the underside of the lever 49 engaging a lower stop pin 80 (see FIG. 9) which projects upwardly from the upper face of the control head 10.

In this lever position B, a cam 81 on the underside of the cam disc 50 presses down an actuator head 82 (see FIG. 6) to open the gas charging valve 78. The construction of the valve 78 is substantially the same as that of the liquid control valve 53 shown in FIG. 4, and need not be described in great detail. The lower valve chamber 83 of the valve 78 is supplied with charging gas under pressure through a passage 84 (see FIG. 7) drilled in from a point 85 on the outer face of the control head 10. The drill passes through the chamber 83 and over to a pocket 86 to which the charging gas is admitted at a reduced pressure. After drilling, the passage nearest the point 85 may be permanently closed by a tight plug 85*a*.

When the cam 81 opens the gas valve 78, gas received through the port 84 flows through the pocket 86 and passes up through the tubular valve core 87 (see FIG. 6) into the upper valve chamber 88. From the chamber 88 the gas passes down a passage or duct 89, which is similar to the duct 73 and has a lateral passage like the duct 74, described in connection with FIG. 4. The passage 89 conducts the gas to a delivery tube 90 that passes down through the interior of the charging chamber 1 (see FIG. 1), to a low level in the contained liquid. At that point the tube 90 (see FIG. 12) has a horizontal extension 91 to which an injector nozzle 92 is threaded at a fitting 93, where the nozzle 92 is formed with a tubular shank 94.

The body portion 95 of this nozzle 92 is preferably pressed into flat form and has an outlet 96 of slit form (see FIG. 13) that extends throughout the width of this "fan-shaped" portion. In practice, the slit 96 is very narrow, constituting only a contact line along which the inner faces of the flat walls 97 of the flattened mouth of the nozzle are closely juxtaposed against each other. The tube 90 is of very small diameter, preferably of the order of one-sixteenth of an inch. The small superficial area of the tube and nozzle minimizes the amount of gas erupted from the charged liquid when the chamber 1 is later vented and brought down to atmospheric pressure. Furthermore, this tube is preferably made of material such as copper or stainless steel, and in accordance with our invention is preferably provided with a non-metallic coating such as lacquer. Lacquer is also preferably applied to the inner face of the carbonating chamber and baked in place. The coating prevents contact between the acid gas and the base metal associated with the carbonating chamber, and this minimizes catalytic action. Or the chamber may be made from stainless steel or other metal that does not react with the chemicals being used.

The gas is delivered to the nozzle under considerable pressure, though the pressure is much reduced from that at which it is delivered from behind the orifice 116 (see FIG. 7) into the pocket 86. By reason of the pressure of the gas entering the nozzle 92 in operation, the slit 96 which constitutes the outlet from the nozzle 92 is opened up, that is, widened, particularly near its middle, sufficiently to permit the gas to flow out. This occurs with a fan-shaped delivery current, as indicated by dotted lines 98 in FIG. 12. This manner of delivery of the gas into the liquid in the charging chamber is very efficient in effecting a rapid and thorough mixture of the gas with the liquid and is highly desirable in a carbonating apparatus.

This invention includes novel means for delivering the gas into the pocket 86 at a pressure reduced from that of the source of this gas (which usually would be a cylinder 99 under a pressure of approximately 700 pounds per square inch). This novel means avoids necessity for employing a regulator or reduction valve, though one may be used if desired. Prior-art reduction valves comprise a number of parts including a pressure-sensitive member containing an outlet, and functioning in a manner that makes the area of the delivery outlet responsive to the rate of consumption of the gas beyond the outlet. Such regulator valves are used largely in connection with the delivery of gaseous fuel to burners such as burners used in industrial plants or stoves having a plurality of burners, one or all of which may be in use at any instant.

In the present installation illustrated, the cylinder or bottle 99 supplying high pressure carbon dioxide gas for carbonating liquids may be supported on a bracket-form shelf 100 welded to the side of the ice tank or casing 2 as shown in FIG. 1. The upper portion of the cylinder 99 is held upright by means of a belt 101 of strap material which encircles its outer side, the ends 102 being welded or riveted to the side wall of the casing 2. This cylinder 99 is removable for replacement by another cylinder when its contents have been exhausted. The upper end of the cylinder 99 carries a hand operated valve 102 and a safety valve 103 to relieve a dangerous pressure in case the cylinder becomes warm to an extent that would considerably raise the pressure of its contents.

When such a cylinder 99 is in an upright position, the liquid $CO_2$ may have a level such as indicated by the broken line 104 in FIG. 1. When the handwheel 105 is operated to open the valve 102, the gas in the upper portion of the cylinder 99 above the liquid level 104 flows through a tubular connection 106 of small inner diameter to a connection 107 on the side of the control head 10. The tubular connection 106 is usually provided on the cylinder 99 and is usually composed of high-quality copper or similar material. It must be capable of safely carrying an internal pressure approximating that of the gas and liquid within the cylinder 99.

Our pressure-reduction device comprises a body member 108 connected into a threaded socket 109 in the side of the control head 10. The body 108 has a pocket 110 into which the gas flows from a centrally disposed inlet port 111. The pocket 110 carries a packing 112, preferably of some compressible material such as filter paper or other suitable packing, which acts as a diffusing material and is held in its packed condition by a stainless steel screen 113 of fine wire mesh through which the gas issues into a small outwardly flaring pocket 114 sealed on its outer and inner sides by compressible annular gaskets 115.

From the pocket 114 the gas passes through an extremely small aperture 116 formed through the center of a metallic disc or diaphragm 117, preferably of stainless steel. This aperture is of very small size, of the order of five thousandths of an inch in diameter, an important feature of this invention. The gas coming through this aperture expands into a flaring conical pocket 86 from which it flows through the passage 84 to the gas charging valve 78 shown in FIG. 7.

With this apparatus a carbonating operation requires only about thirty seconds to effect the complete carbonating of the liquid in the carbonating chamber 1. Referring to FIG. 8, when the carbonation is complete for practical purposes, the gas under pressure in the upper end of the charging chamber 1 is communicated up through the passage 30, the valve chamber 29, and the horizontal passage 44, to the relief valve 45. This opens the relief valve and permits a quantity of gas to escape under pressure through the outlet port 118, producing an audible whistle-like signal. Upon hearing this signal, the operator of the apparatus throws the lever 49 over to lever position C, illustrated in FIG. 10, in which a cam 119 is moved directly over a vent valve 120, shown in FIG. 5, depressing an actuator head 121 and opening valve 120. Opening the valve 120 reduces the pressure in the carbonating chamber 1 to atmospheric, gas passing through a passage 122 into the lower valve chamber 123, thence through a tubular valve core 124 into an upper valve chamber 125 and thence to the atmosphere through a port 126. In other words, the valve 120 with its associated parts is a substantial duplicate of the vent valve 53.

The operation of the apparatus illustrated in FIGS. 1 to 13 will now be reviewed. At the start, the control handle or lever 49 is in its neutral or normal position, shown in FIG. 2. In operating the apparatus the lever 49 is first moved to the lever position A shown in FIG. 8. In this position the cam 51 is over the actuator stem 35 and depresses the valve stem 34 of the valve 25, so that liquid flows from the supply pipe 9 past the valve 25 to the valve chamber 29, and down the passage 30, as shown in FIG. 3, to the charging chamber 1. In lever position A the cam 52 is over the valve 53 and opens it by pressing down the actuator head 55. When the liquid rises in the dip tube 72, the pressure above the liquid level sends a spurt through the duct connections 73 and 74, the lower valve chamber 71*a*, the open valve 53 and out through the tell-tale vent 70. This indicates to the operator that the charging chamber 1 is filled with liquid to the desired height and ready to be charged with gas.

The operator then moves the lever 49 away from position A, cutting off the flow of liquid, to position B shown in FIG. 9, where the cam 81 depresses valve 78. Gas accumulated in the pocket 86 flows through passage 84, valve chamber 83, and the tubular valve core 87 (see FIG. 6) to the upper valve chamber 88, whence it flows down the passage 89 and the long inlet tube 90 to the nozzle 95 and forces its way through the fan shaped outlet 96. But after the valve 78 has opened, the pressure of the gas in the pocket 86 is immediately reduced relative to that of the gas supply. When the charging operation is completed, the pressure in the charging chamber 1 rises to a desired predetermined pressure, and this pressure is communicated through the passage 30, valve chamber 29 and port 44 (see FIG. 3) to open the vent valve 43; the spring 46 yielding to the pressure exerted upon the ball 45. This causes a whistling or popping signal as the gas flows through the outlet port 118. The entire charging operation usually requires only about half a minute.

When the operator hears the signal, he moves the lever 49 to the lever position C, venting the space in the upper end of the charging chamber 1 to the atmosphere, since the valve 120 is depressed by the cam 119. (See FIGS. 3, 5, and 10.) After venting is complete, the operator may open the faucet F to permit the carbonated water, or other gasified liquid, to flow by gravity at atmospheric pressure through the pipe *f* and into a container such as a bottle or the like set in place below the faucet. This completes the cycle of operation.

As indicated above, although this apparatus is intended to be employed as a carbonating apparatus, it can, of course, be employed for charging a liquid with any gas; for example, it may be used as a chlorinator.

*The Carbonator of FIG. 14*

FIG. 14 shows the apparatus of our invention employed in a general arrangement, including a mechanical refrigerating apparatus for cooling the liquid, for example, water, before it is introduced into the charging chamber. Such apparatus includes an outer casing 127 which, as illustrated, has two transverse floors 128 and 129 that divide the interior of the casing into three chambers 130, 131, and 132. The chamber 130 houses a combination electric motor and refrigerating machine 133 which cools a refrigerating medium that passes up a delivery pipe 134 to a cooling coil (not illustrated) in a heat exchanger tank 135. The cooling medium passes back through the pipe 136 to the refrigerating machine 133.

In the present instance, a supply pipe 137 passing up from a point below the floor level 150 delivers the liquid to be charged to the interior of the tank 135. There it is cooled to a low temperature and flows up a pipe 138 through a T-connection into a pipe 139 that corresponds to the pipe 9 illustrated in FIG. 1. The pipe 139 delivers the liquid into a control head 140 mounted on the upper end of a charging chamber 141, which is supported on the upper floor 129. The control head 140 is provided with a hand-operated control-member 142 including a cam disc 143, the underside of which is provided with the same set of cams already described in connection with the control disc 50.

Access to the chamber 131, which houses the supply cylinder 144, may be had by opening the hinged door **151*a*. From the valve 145 the copper tube 146 extends up to the control head 140 and into a pressure reducing connection such as illustrated in FIG. 7, and previously described. In other words, all of the features described above in connection with the charging chamber 1 and the control head 10 are present in the charging chamber 141 and control head 140** illustrated in FIG. 14.

In the apparatus shown in FIG. 14 the charging chamber 141 is provided with a dispensing faucet 147 attached to a pipe connection 148 extending out through the wall of the casing 127 to fill containers that may be placed on the shelf 149 below the faucet. This faucet is similar to the faucet F illustrated in FIG. 1. If desired, a bent pipe connection 152 may extend up from the T-connection through the cover well 153 of the casing 127, to serve as a drinking fountain 154.

As we have seen so far, the procedure in practicing our invention is to provide one or more relatively small orifices for injection of the $CO_2$ gas into the carbonating chamber of water, preferably at the lower end of the chamber, and under a relatively high pressure, preferably approximately 400 pounds per square inch at the orifice, and with a relatively small volume of gas space above the liquid level. This gas space preferably approximates ten percent (3% to 15%) of the entire volume of the carbonating chamber, as indicated by the location of the water line in FIG. 1 of the accompanying drawing. Under these circumstances it is possible to effect the absorption of enough $CO_2$ to obtain a practical saturation range. And after venting to the atmospheric pressure, the carbonated water is suitable for making highly carbonated beverages by mixing it with syrup, and the beverages may subsequently be bottled to correspond in degree of carbonation to commercially bottled carbonated drinks.

The admission of the gas may be accomplished through an orifice, preferably in the form of a slit 96 extending in a horizontal plane (see FIGS. 4 and 13); and the $CO_2$ is preferably at a pressure of approximately 400 pounds per square inch, and of course, the portion of the gas that is not absorbed by the liquid escapes upwardly through the surface 69 of the liquid. This surface is located approximately at the tip 76 of the tube 72 (see FIGS. 1 and 3). When charging in this way, it requires approximately thirty seconds to complete the charging operation after the pressure in the gas space has arisen to a pressure greatly in excess of atmospheric pressure, for example, 300 pounds per square inch.

*The Carbonating Apparatus of FIGS. 15–23*

A modified form of the invention is shown in FIGS. 15 through 23. This apparatus is quite simplified with respect to those previously described and is less expensive to manufacture.

This apparatus may comprise a base 200 supporting a standard 201, at the top of which is a platform 202. The platform 202 may support a container 203, which may be a metal or plastic bucket, holding cold water. In this instance the water may be cooled by ice cubes, chips, or blocks. Being elevated on the standard 201, the water in the bucket 203 has a pressure head relative to everything lower, so this arrangement eliminates the need for direct pressure connections with faucets or mechanical cooling devices. It also eliminates the necessity of providing any direct cooling in the carbonation chamber itself. Near the bottom of the bucket 203 is an outlet 204 from which a tube 205 leads to a valve 206. The valve 206, of a well-known type, is provided with a handle 207 which either shuts off the flow or opens the valve 206 so that the cold water can pass via a tube 208 into a fitting 209 at the lower end of a carbonation tank or charging chamber 210. From the fitting 209, an outlet tube 211 leads to a normally closed valve 212 having a handle 213 and a spigot 214, from which the carbonated product may be dispensed.

The carbonation tank 210 may comprise a hollow stainless steel container manufactured so as to be able to withstand considerable pressure. Its interior walls need not be lined unless made from a material tending to liberate $CO_2$ from water, and then they should be coated as described earlier. Other materials may be used in the construction so long as no catalytic action is developed and so long as the pressures encountered can be satisfactorily withstood. The tank 210 is imperforate except for a lower opening 215 connected to the lower fitting 209, and an upper opening 216 connected to an upper fitting 217.

The upper fitting 217 may be made in one piece or in several pieces. It is provided with an interior vertical passage 218 that leads via a passage 219 to a valve 220. The valve 220 is normally in closed position but has a handle 221 that is operable to open the valve 220. Fluid can then pass through an outlet fitting 222 to a tube 223 whose outlet 224 terminates directly above the upper end of a vertical waste tube 225, so that the fluid discharging from the tube 223 is visible as it flows into the tube 225. The tube 225 is supported on the base 200 and has a drain outlet tube 226 that preferably is always open, and may drain into the sink, when the device is used in a kitchen.

A gas pressure gauge 227 (see FIGS. 18 and 19) is connected by a passage 228 to the passage 218, while a separate passage 229 leads to a pressure relief valve 230. The valve 230 may comprise a seat 231, a movable closure member 232, and a spring 233 normally urging the closure member 232 against the seat 231 with a pressure of predetermined value. When the pressure inside the tank 210 exceeds that predetermined value, the member 232 is forced away from its seat 231, and gas passes out through a tube 234 into the vertical waste pipe 225. The passing of such gas is quite audible and serves as a signal. Additional support for the tank 210, the fitting 217, and the associated elements may be obtained by a ring 235 around the standard 201 and a rod, tube, or bar 236 connected to a gauge-supporting fitting 237.

A carbon dioxide cylinder 240 may be connected by suitable tubing 241 to gas inlet 242 in the upper fitting 217. The inlet 242 leads to an on-off valve 243 with a handle 244. When open, the valve 243 conducts the gas via a passageway 245 to an orifice 250 in a plate 251 at one end of a tubing 252. This orifice 250 is preferably a single fine hole, in the order of 0.005″ to 0.007″ in diameter (see FIG. 23), which corresponds to a cross-sectional area in the order of about 0.000019 to 0.00004 square inch. Orifices larger than 0.01″ in diameter (0.0000785 square inch cross-sectional area) let the compressed gas through much too quickly and build up too much pressure beyond the orifice 250. A fitting 253 supports the plate 251, and an O-ring 254 seals against leakage when the fitting 253 is tightened by a tubular nut 255 that screws around a nipple 256 on the upper fitting 217.

The tube 252 connects to a vertical tube 260, whose upper end is provided with a fitting 261 having an O-ring 262 sealed when a nut 263 is tightened around another nipple 264 on the upper fitting 217. The tube 260 leads down through the passage 218 into the tank 210. It has an outlet fitting 265 supporting a plate 266 with one or more outlet openings 267.

Preferably, the orifices 267 are directed down and terminate a suitable distance above the bottom of the tank 210. In a two-quart container shaped like the tank 210, the fitting 265 preferably lies about 2″ to 2½″ from the bottom. When the fitting 265 is too close to the bottom, the gas jet stream impinges on the metal surface of the container and loses its effectiveness to break up the water. The fitting 265 may be from about 1½″ above the bottom to about an inch above the horizontal center line of the tank 210. In tests through an 0.01″ diameter opening 267 at 400 p.s.i., 4.7 volumes of $CO_2$ were absorbed in water when the opening 267 was located 1.75″ above bottom, and only 1.9 volumes were absorbed under the same conditions when the orifice 267 was located ½″ above bottom.

Preferably, the total cross-sectional area of the orifices 267 is between one and three times as much as the total cross-sectional area of the restrictor orifice 250 (see FIGS. 20 and 21). Ratios within this range prevent the build-up of excessive pressure in the tube 260, which is a relatively cold zone, and thereby normally prevent liquefaction of the carbon dioxide gas behind the outlet openings 267. As stated before, liquefaction of the gas and subsequent expansion results in freezing any contained moisture and thereby plugs the apparatus. If dry gas could always be assured, liquefaction might not be a serious problem and the high cylinder pressures could be used without reduction, but this appears to be a vain hope in the light of the well-known fact that commercial carbon dioxide does contain moisture, especially after a cylinder has been allowed to stand empty with an open valve and then stored for a few days, weeks, or months, permitting moisture to be condensed inside as the cylinder breathes from the atmosphere with temperature changes. When the cylinder is recharged, the water is in the cylinder. The present invention, therefore, preferably provides the restrictor orifice which solves the problem.

Several small outlet openings 267 are generally preferred to one large one, because the small openings cause the formation of very small gas bubbles. These issue under considerable pressure and tend to tear the liquid apart; they present a very finely divided and highly agitated state that aids in dissolving the gas in the water.

At the beginning of operations, in this form of the invention, the bucket 203 is filled with ice water and the valve 206 is opened so that water flows from the bucket 203 into the tank 210. The valve 220 is also open at this time; so when the tank 210 gets full, water overflows through the valve 220 and tube 223 into the waste tube 225. When water does flow into the tube 225, the operator knows the tank 210 is full and he closes the valve 206. The valve 212 is then opened to drain off a predetermined amount of water lying within the range of 3% to 15% of the tank 210 capacity, e.g., ¼ cup to 1 cup in a two-quart container 210, so that the water in the tank 210 is at a desired level 270, shown in FIG. 19, and there is the proper volume for gas above it. Uniformity of carbonation in successive runs is maintained by uniform liquid withdrawal. The valve 212 is then closed, and the valve 220 is also closed.

Next, the valve 243 is operated to send gas from the cylinder 240 into the tank 210. The gas passes through the minute orifice 250, which acts as a pressure-reducing regulator, cutting down the pressure from the 700 or 800 p.s.i. cylinder pressure to a level within the range preferably of about 250–350 p.s.i. From there the gas passes through the tubes 252 and 260 to the outlet orifices 267 whence it issues as a stream of very high velocity and force, which in 20 to 30 seconds causes absorption of $CO_2$ gas to take place, a very satisfactory time for making bottled beverages. The gauge 227 if used, indicates the gas pressure inside the tank 210. In any event, the relief valve 230 opens at a predetermined pressure and audibly vents gas through the tube 235 into the waste tube 225. The valve 243 is then turned off, for the tank 210 is charged. The valve 220 may then be opened to let off excess gas through the tube 223. After the pressure in the upper part of the chamber 210 has been reduced to an atmospheric level, the valve 212 may be opened and carbonated water flows out from the tank into any suitable vessel 271 where it may be mixed with syrup and bottled or consumed.

*Nozzle Sizes, Pressures, and Their Effects*

Tests have been made to determine the effects of orifice size at both the restrictor orifice 250 and the nozzle orifice 267 and the effect of pressure back of the orifice 267. The results of some of these tests are plotted in the graphs comprising FIGS. 24 and 25. FIG. 24 plots the volumes of carbon dioxide absorbed in the water at 40° F. against the area of the nozzle jet in square inches. In each of the three test points the cylinder pressure was 800 p.s.i. and the other conditions were as shown in the following Table I:

TABLE I

*Data From Which Graph of FIG. 24 Was Plotted*

| Test No. | Restrictor orifice, inches, dia. | Nozzle diameter, inches | Delivery pressure back of nozzle into atmosphere, lbs. | Pressure build-up in carbonator, lbs. | Volumes $CO_2$ absorbed |
|---|---|---|---|---|---|
| 1 | .005 | .005 | 360 | 300 | 4.65 |
| 2 | .005 | .007 | 230 | 300 | 3.5 |
| 3 | .005 | .010 | 150 | 300 | 2.65 |

It will be seen that in this test a constant restrictor orifice of 0.005" diameter was used with a constant cylinder pressure. Three different sizes of nozzles 267 were used, and the gas was admitted until a pressure of 300 p.s.i. was built up in the carbonator tank 210. The differences in the amount of carbon dioxide absorbed show that a nozzle diameter of 0.01" would not ordinarily give enough absorption to give beverage satisfaction. It may be noted that with the 0.01" orifice opening it took one minute and 15 seconds to build up 300 p.s.i. in the carbonator and that the pressure back of the nozzle was 150 lbs. When the 0.007" diameter nozzle was used with the same cylinder pressure, the 300 p.s.i. pressure in the carbonator was reached in one minute 48 seconds, and the pressure back of the nozzle was 230 p.s.i. With the 0.005" nozzle it took three minutes, 42 seconds to build up 300 p.s.i. in the carbonator, and the pressure back of the nozzle was 360 p.s.i.

The fact that significant increases in absorption were obtained by changing the nozzle sizes is important. It then became important to know whether it was pressure back of the nozzle or the actual nozzle diameter that affected the degree of carbon dioxide absorption. Accordingly, further tests were run, resulting in the graph of FIG. 25 and in the data of Table II:

TABLE II

| Test No. | Diameter of nozzle orifice in inches | Area of nozzle orifice in sq. in. | Pressure, lbs./sq. in. back of nozzle orifice | Pressure equalized in the carbonator, lbs./sq. in. | Time in seconds to complete run | Volumes $CO_2$ absorbed in water in the carbonator |
|---|---|---|---|---|---|---|
| 4 | .0205 | .00033 | 300 | 250 | 17 | 3.1 |
| 5 | .010 | .0000785 | 300 | 250 | 66 | 3.5 |
| 6 | .0047 | .000017 | 300 | 250 | 246 | 3.9 |
| 7 | .00175 | .00000024 | 300 | 250 | 414 | 4.35 |
| 8 | .0205 | .00033 | 400 | 250 | 13 | 3.9 |
| 9 | .010 | .0000785 | 400 | 250 | 53 | 4.1 |
| 10 | .0047 | .000017 | 400 | 250 | 184 | 4.2 |
| 11 | .00175 | .00000024 | 400 | 250 | 319 | 5.0 |

The tests shown in FIG. 25 and Table II were made by eliminating the restrictor orifice 250 and supplying pressure at a constant 300 p.s.i. in four instances and 400 p.s.i. in the other instances. The resultant volumes absorbed and the timing are quite significant. In this instance the temperature was 54° F. and the pressure in the carbonator was 250 p.s.i.

The above tests show that both the nozzle area and the pressure back of the nozzle are important and that increased carbonation may be obtained by increasing the pressure back of the nozzle orifice or by decreasing the nozzle area or, preferably, by both.

Other tests indicate that the nozzle orifices should give a total area approximately twice that of the area of the restrictor orifice or within the range between of 1 to 1 and 3 to 1. They also indicate that the restrictor orifice can be eliminated only if pressure back of the nozzle orifice is properly controlled to obtain an even pressure back of the nozzle at a desired level.

To illustrate the criticality of the orifice sizes and the effects of the small orifices on $CO_2$ absorption in water, especially where the container is filled nearly full of water, leaving only a small gas cushion area and therefore reducing the wastage of gas, some additional tests were run. The nozzle sizes were still quite small; in fact they were made by a #60 drill (0.040" diameter), two nozzle orifices being used. The pressures were varied, and the volumes of $CO_2$ absorbed immediately, without agitation, were calculated, giving the results shown in Table III:

TABLE III

*Results Obtained From Two 0.040" Nozzle Orifices (Larger Than the Critical Size of This Invention)*

| Test No. | Percent gas space in container | Pressure at at nozzles, p.s.i.g. | Pressure equalized in the carbonator, p.s.i.g. | Time in seconds to complete run | Volumes $CO_2$ absorbed in water, less than— |
|---|---|---|---|---|---|
| 12 | 40 | 110 | 100 | 15 | 1.5 |
| 13 | 40 | 160 | 150 | 20 | 2.2 |
| 14 | 40 | 210 | 200 | 23 | 3.1 |
| 15 | 40 | 260 | 250 | 27 | 4.1 |
| 16 | 40 | [1] 800 | 250 | 6.9 | 8.0 |
| 17 | 25 | [1] 800 | 250 | 4.8 | 6.0 |
| 18 | 10 | [1] 800 | 250 | 2.7 | 3.5 |
| 19 | 5 | [1] 800 | 250 | 1.8 | 2.2 |

[1] Pressure direct from cylinder with no restrictor orifice.

As Table III shows, pressures of 100–200 p.s.i. were quite ineffective, even when there was a large cushion, by which much more gas was made available—and much more was wasted—than in the present invention. The large gas space did make carbonation practical—if the carbon dioxide was very dry, as was that used in this test—with high pressures, but large amounts of gas were wasted. The gas space meant that it took many times as much carbon dioxide to achieve the same result, and since carbon dioxide is the only material of significant cost in making carbonated water, the net result is a multiplication of cost.

As Table III also shows, once the gas space was reduced to a value somewhere between 10% and 25%, only a low, unusable carbonation value was obtained. In other words, at air spaces within the range contemplated by this invention (which is usually 5%) these two 0.040" nozzles resulted in inoperability.

Still further tests have been run to illustrate the effects of proper nozzle sizes and nozzle sizes outside the critical range. In these tests very dry carbon dioxide was used, giving conditions where the restrictor orifice was not needed. These tests were run without a restrictor orifice at full cylinder pressure, with a 5% gas space, and the pressure was equalized at 250 p.s.i. in the carbonator. These results are summarized in Table IV:

TABLE IV

| Test No. | Orifice nozzle diameter, inches | Time in seconds to complete run | Volumes of $CO_2$ absorbed, less than— |
|---|---|---|---|
| 20 | 0.031 | 1.4 | 1.5 |
| 21 | 0.020 | 4.9 | 3.9 |
| 22 | 0.010 | 16.8 | 4.8 |

Only the latter two sizes lie within the scope of this invention. The effect is quite significant of the criticality involved.

Further tests have shown the importance of pressure with small orifice sizes. In Table V, there was only a 5% gas space in all tests.

TABLE V

| Test No. | Orifice nozzle diameter, inches | Pressure at nozzle, p.s.i.g. | Pressure equalized in the carbonator, p.s.i.g. | Time in seconds to complete run | Volumes $CO_2$ absorbed in water |
|---|---|---|---|---|---|
| 23 | 0.031 | 100 | 100 | 5 | 0.8 |
| 24 | 0.020 | 100 | 100 | 7.4 | 0.9 |
| 25 | 0.010 | 100 | 100 | 31 | 1.0 |
| 26 | 0.010 | 150 | 150 | 38 | 1.4 |
| 27 | 0.010 | 200 | 200 | 43 | 1.9 |
| 28 | 0.010 | (1) | 250 | 27.6 | 4.5 |

[1] In this test a restrictor 0.007" in diameter was used with full tank pressure directed into it, in order to reduce the pressure at the nozzle; in the other tests a regulator was used.

The conclusion is therefore justified that the combination of nozzle size and pressure gives unusual, unexpected, and unobvious results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In gas charging apparatus, the combination of a charging chamber containing the liquid to be charged with a gas, a control-head associated with said charging chamber, a liquid connection including a refrigerated coil through which the liquid is delivered into said head, a liquid controlling valve within said head for supplying the liquid from the head into said charging chamber, means for maintaining a supply of the said gas under a desired relatively high pressure, a connection from said supply means to said control head, means associated with said last named connection for presenting a minute orifice in the line of flow through said connection, said orifice being of sufficiently minute diameter to emit the said gas at the delivery side of said orifice at a substantially reduced pressure below the pressure of the gas supply, a tubular conduit for conducting the gas that passes said orifice to a low level within the liquid in said chamber, a nozzle at said low level for emitting the gas into the liquid, and a gas valve in said control-head for controlling delivery of the gas through said connection into said charging chamber, and a single movable element mounted on said control-head for controlling the flow through both of said valves.

2. A gas charging apparatus according to claim 1, including a vent-valve in said head for venting the interior of said charging chamber; and in which said single movable element is capable also of controlling said vent-valve.

3. A gas charging apparatus according to claim 1, including a relief valve carried by the head and communicating with the interior of said chamber operating to limit the pressure of the charged liquid.

4. A gas charging apparatus according to claim 2, including a dip-tube extending down into the said chamber, and a conduit leading from the dip-tube to the said vent-valve and operating to admit liquid from the dip-tube into said conduit when the charging chamber has become filled with the liquid; said head having a tell-tale outlet for the overflow of a portion of the liquid from the control-head when the vent is open.

5. A gas charging apparatus according to claim 1, including a delivery pocket into which the said connection delivers the gas flowing to the said control-head, a compressed packing material within said delivery pocket, a relatively fine screen through which the flow of gas passes before reaching the said minute orifice, said packing functioning to promote a uniform degree in the reduction in pressure of the gas flowing into the liquid in the said charging chamber.

6. A gas charging apparatus according to claim 1, in which the said minute orifice is of the order of two thousandths of an inch in diameter.

7. A gas charging apparatus according to claim 1, including a tube of relatively small inside diameter passing into the interior of said charging chamber and carrying a discharge nozzle at a low level in the liquid contained in the charging chamber.

8. A gas charging apparatus according to claim 7, in which the said nozzle presents two substantially juxtaposed walls, with a slit of minute width between them; and in which the pressure of the said gas forces its way through the said slit.

9. In gas charging apparatus, the combination of a charging chamber for containing a liquid to be charged and having a duct for conducting said liquid to the charging chamber, with a spring-loaded normally closed liquid control valve in said duct for controlling the flow of the liquid to said chamber, said apparatus having an exterior tell-tale orifice with a vent-duct leading to the same from the interior of the charging chamber for indicating when the chamber has become filled with the liquid that is to be charged, a spring-loaded normally closed vent-valve in said vent-duct, means including a duct through which the gas is conducted to said chamber for charging the liquid therein, with a normally closed gas valve in said gas duct for controlling the flow of gas into the charging chamber, and a single element capable of assuming two different positions to effect the filling of said chamber with said liquid, for effecting a tell-tale out-flow at the said tell-tale orifice when the said chamber has become filled with the liquid, and for opening the gas valve for charging the liquid in the charging chamber.

10. In a gas charging apparatus for charging a liquid, the combination of a charging chamber, a control-head having a passage for conducting a liquid through the said head into said charging chamber, a liquid control-valve in said passage for admitting the liquid to fill said chamber, said head also having a passage for conducting the gas under pressure into the said chamber, and having a gas-valve therein for controlling the flow of said gas into said chamber, said head also having a vent passage leading from the interior of said chamber at a high level therein, to the exterior, and including a tell-tale orifice on the exterior of said apparatus, said vent passage including a vent-valve for opening or closing off the communication through the vent passage to the exterior, a movably mounted control element capable of assuming a first position, and having means operating in said first position to open the liquid control valve, and the vent valve for substantially filling the charging chamber and effecting a tell-tale flow of a portion of the liquid through said tell-tale orifice when the chamber has been filled, said control element capable of assuming a second position, and having means for opening said gas-valve when in said second position to maintain the gas-valve open for admitting a charge of gas to said chamber and pressure actuated tell-tale relief-valve communicating with said chamber for emitting an audible signal when a predetermined pressure is reached in said chamber.

11. A gas charging apparatus according to claim 10 in which all of said valves are spring-loaded to their closed position.

12. Gas charging apparatus according to claim 10, including a dispensing faucet communicating with the lower end portion of the charging chamber, and means for effecting the venting to atmosphere of the upper interior portion of the charging chamber to permit flow by gravity of the charged liquid into a container held below the faucet.

13. Gas charging apparatus according to claim 10, including a dispensing faucet, connected to the lower interior portion of the charging chamber, and means for effecting the venting of the upper interior portion of the charging chamber through the agency of the said control member to facilitate the said flow of the liquid from the charging chamber.

14. A device for carbonating a predetermined volume of water within a closed container without mechanical agitation to cause absorption of at least three volumes of gas in approximately one minute for each two quarts of water at a temperature of less than 60° F. and in which the volume of the water is between 85% and 97% of the volume of the container comprising, a nozzle within the container below the level of the liquid and having a cross-sectional area less than .0004 square inch, means for delivering a continuous stream of gas to said nozzle under a pressure at least 300 p.s.i. to raise the pressure within the container to a predetermined value of at least 250 p.s.i., means communicating with the interior of the container to provide an indication upon the reaching of the predetermined pressure within the container, means for terminating the flow of gas to the nozzle, and means for venting the gas from the space above the water to reduce the pressure in the container to that of the atmosphere, the container having an opening adjacent to the bottom thereof, and a controllable valve cooperating with the opening for allowing withdrawal of the charged water from the container.

15. A device for carbonating a predetermined volume of liquid as defined by claim 14 including, a duct for connecting the nozzle to a gas source at a high pressure exceeding 300 p.s.i., and an obstruction in said duct having a small orifice for reducing the pressure at said nozzle to the predetermined value.

References Cited in the file of this patent

UNITED STATES PATENTS

| | | |
|---|---|---|
| 1,308,587 | Heuser | July 1, 1919 |
| 1,591,971 | Garrett | July 13, 1926 |
| 1,958,938 | Bohandy | May 15, 1934 |
| 2,196,997 | Larson | Apr. 16, 1940 |
| 2,235,218 | Koenig | Mar. 18, 1941 |
| 2,305,796 | Siedel | Dec. 22, 1942 |
| 2,511,649 | Reiter | June 13, 1950 |
| 2,522,258 | Fanshier | Sept. 12, 1950 |
| 2,721,064 | Reichardt | Oct. 18, 1955 |